United States Patent [19]

Berni et al.

[11] 4,014,754

[45] Mar. 29, 1977

[54] RECOVERY OF LACTAM SOLVENT FROM VINYL POLYMER SOLUTION

[75] Inventors: Rene P. Berni, Cliffside Park; Donald H. Lorenz, Basking Ridge, both of N.J.; Earl Pierce Williams, Pen Argyl, Pa.

[73] Assignee: GAF Corporation, New York, N.Y.

[22] Filed: Apr. 25, 1975

[21] Appl. No.: 571,716

[52] U.S. Cl. .................................. 203/64; 134/12; 203/57; 260/239.3 A; 260/326.5 FM

[51] Int. Cl.$^2$ .................. B01D 3/34; B08B 7/04; C07D 210/00; C07D 207/12

[58] Field of Search .......... 260/326.5 FL, 92.8 A, 260/239.3 A, 326.5 FM, 326.5 FN; 134/12, 38, 40, 42; 202/68, 69, 70; 203/64, 57

[56] References Cited

UNITED STATES PATENTS

| 3,179,609 | 4/1965 | Morison | 134/38 |
|---|---|---|---|
| 3,475,218 | 10/1969 | Torrenzano et al. | 134/38 |
| 3,624,009 | 11/1971 | Sussman et al. | 134/38 |
| 3,666,691 | 5/1972 | Spillerr | 134/38 |
| 3,673,099 | 6/1972 | Corby et al. | 134/38 |
| 3,813,309 | 5/1974 | Bakos et al. | 134/38 |

*Primary Examiner*—Jack Sofer
*Attorney, Agent, or Firm*—Walter C. Kehm; Joshua J. Ward

[57] ABSTRACT

N-lower alkyl lactam solvent is recovered from a solution of polymer such as PVC residue in such solvent by adding to the solution a plasticizer for the polymer and then recovering the lactam from the solution by distillation. The plasticizer has a boiling point of at least about 25° C above the boiling point of the lactam solvent. A stabilizer for the polymer may also be used.

19 Claims, No Drawings

4,014,754

RECOVERY OF LACTAM SOLVENT FROM VINYL POLYMER SOLUTION

BACKGROUND OF THE INVENTION

N-lower alkyl pyrrolidones such as N-methyl-2 pyrrolidone are known as excellent solvents for many polymers. Such lactams are high boiling, have low toxicity and are being extensively used for recovery of polymers such as polymeric residues from equipment such as polymerization reactors. A process for removing polymeric residues from processing equipment using N-methyl pyrrolidone solvent is, for instance, disclosed in U.S. Pat. No. 3,764,384 to Bernie. While the process described in this patent and similar processes are successful, problems have been encountered in separating lactam solvents from polymer residue with the desired efficiency. There is a strong tendency in many such processes for excessive amounts of solvent to be unrecoverable, thus leading to high costs for such cleaning operations. This is due to an increase in viscosity of the solution as solvent is distilled off, thus making it increasingly difficult to remove additional solvent.

It has also been suggested to recover polymer by adding the solvent-polymer solution to water so that the polymer precipitates and then filtering out the precipitate and removing the water. While theoretically attractive, this is impractical on a large scale because of the large volumes of water necessary to obtain adequate precipitation of polymer.

SUMMARY OF THE INVENTION

It is an object of the present invention to provide an improved method for recovering N-lower alkyl lactam solvent from solutions of such solvent containing polymer. It is a further object of the invention to provide novel compositions of matter which aid in such recovery.

In accordance with the invention, N-lower alkyl lactam solvent is recovered from a solution of polymer therein by adding to such solution a material which is a plasticizer for the polymer and which has a boiling point at least about 25° C above the boiling point of the lactam. Following addition of the plasticizer, the lactam solvent is recovered from the solution by distillation. In a preferred embodiment of the invention, the lactam is N-methyl pyrrolidone and the polymer is polymeric residue of vinyl halide homopolymer production present in amounts between about 1 and about 20 weight percent (wt. %) based on the amount of lactam in the solution. Where the vinyl halide is vinyl chloride, a preferred stabilizer is zinc oxide. Mineral oil boiling above about 250° C and having a viscosity between about 40 and about 300 S.U.S. at 100° F is a preferred plasticizer.

A composition of matter is also provided which comprises a solution of polymer in N-lower alkyl lactam solvent, a plasticizer for such polymer and a stabilizer for such polymer, the plasticizer having a boiling point at least about 25° C higher than the boiling point of the lactam solvent. A preferred composition includes N-methyl pyrrolidone, polymeric residue of vinyl chloride homopolymer production in amounts of between about 1 and about 20 wt. % based on lactam, between about 1.0 and about 15.0 wt. % based on solvent of mineral oil plasticizer boiling above about 250° C and having a viscosity between about 40 and about 300 S.U.S. at 100° F and at least about 0.01 wt. % based on polymeric residue of zinc oxide stabilizer.

DETAILED DESCRIPTION OF THE INVENTION

As mentioned, the process of the invention is broadly applicable to recovery of N-lower alkyl lactam solvent from a solution of polymer in such solvent. In practicing the invention, lactams in which the lower alkyl groups range from 1 to about 7 carbon atoms, including the cycloalkyls, are preferred over longer carbon chain alkyl groups as N-alkyl substituents on the lactams. Among N-lower alkyl lactams suitable for use in the composition and process of the invention are N-methyl pyrrolidone, N-propyl pyrrolidone, N-isopropyl pyrrolidone, N-iso-butyl pyrrolidone, N-n-butyl pyrrolidone, N-n-hexyl pyrrolidone, N-cyclohexyl pyrrolidone, N-methyl piperidone, N-ethyl piperidone, N-propyl piperidone and N-isopropyl piperidone. The invention is especially beneficial with respect to solutions of polymer in N-methyl pyrrolidone.

While the invention is broadly applicable to recovery of lactam solvent from solutions of lactam having any one or more of a wide variety of polymers dissolved therein, it is especially beneficial in connection with the recovery of lactam solvent from solvent solutions obtained by the cleaning of apparatus such as reaction vessels employed in the polymerization of polymers. Polymers for which this type of cleansing operation is particularly effective and which are, therefore, preferred in connection with the invention include vinyl polymers such as the polymers of vinyl halide and their copolymers. Such polymers include, for example, vinyl chloride polymers and copolymers thereof with any one of numerous copolymerizable monomers. The particular monomer employed for copolymerization with the vinyl halide is not critical and may be exemplified by vinyl acetate, vinyl laurate, alkyl acrylates, alkyl methacrylates, alkyl maleates, alkyl fumarates, vinylidine chloride, acrylonitrile, vinyl alkyl ethers such as vinyl acetyl ether, vinyl lauryl ether, vinyl myristyl ether and the like. Furthermore, such copolymers may be a graft copolymer in which one of the constituents is polymeric in nature while the other constituent is a monomer. Exemplary of such grafting materials are polyethylene, copolymers of ethylene, vinyl acetate and others. The invention is also applicable is connection with other polymeric materials such as Nylon C, polyesters, polyurethanes, polyacrylonitriles, polyacrylates, polymethacrylates and copolymers and/or graft polymers thereof as well as polymeric residues of polymerization reactions involving such materials.

Solutions of polymer in N-lower alkyl lactam solvent suitable in accordance with the invention include solutions containing widely varying amounts of polymer. While the concentration of polymer in solvent can vary widely, polymer concentrations between about 1 and about 20 wt. % based upon solvent are preferred. If desired, however, higher concentrations of polymer up to the saturation level of polymer in solvent may be used. Concentrations between about 2 and about 10 wt. % polymer in solvent are especially preferred.

Plasticizers for use in accordance with the invention may be either solvents or nonsolvents with respect to the polymer used. Nonsolvents are preferred where it is desired to separate plasticizer and polymer following removal of lactam solvent. The use of nonsolvent plasticizers in such situations reduces the amount of plasticizer remaining in the polymer. Suitable plasticizers for use in practicing the invention include, for instance, diethylene glycol, triethylene glycol, tetraethylene glycol, mineral oil, diisopropyl glycol, etc. The plasticizers should preferably be relatively inexpensive as compared with the lactam solvent. This is especially true if the plasticizer used is a solvent with respect to the polymer. The preferred plasticizer in practicing the invention, especially where N-methyl pyrrolidone is to be recovered from a solvent solution containing polymeric residue of vinyl halide homopolymer production, is mineral oil such as conventional seal oil. Mineral oil boiling above about 250° C and having a viscosity between about 40 and about 300 S.U.S. at 100° F is preferred. Mineral oils of appropriate viscosity usually boil between about 250° and about 400° C. Plasticizer may be used in any suitable amounts, usually at least about 1.0 wt. % plasticizer based upon solvent, but preferred usage is between about 1.0 and about 15.0 wt. % plasticizer on the same basis.

In practicing the invention it is frequently preferred, especially in dealing with vinyl halide polymers and in the preferred embodiment of the invention involving polymeric residue from vinyl halide homopolymer production, that a stabilizer for the polymer may be used. Any conventional stabilizer may be used for this purpose. Suitable stabilizers which are well known for this purpose include zinc stearate, zinc chloride, zinc sulfide, zinc sulfate, zinc phosphate, zinc ammonium sulfate, zinc acetate, lead salicilate, stearic acid, barium chloride, cadmium carbonate, epoxydized soy bean oil, organo tin complexes, etc. A particularly preferred stabilizer for use in connection with polymeric residue remaining following polymerization of polyvinyl chloride is, however, one which is not normally considered a suitable stabilizer for such polymer, i.e. zinc oxide. Zinc oxide, because of its adverse ultraviolet light and degredation characteristics, is not normally considered a suitable stabilizer for polyvinyl chlorides. However, it has been unexpectedly found that in practicing the present invention zinc oxide is an extremely good stabilizer in connection with solutions of PVC or PVC residues in N-methyl pyrrolidone solvent. Where used, stabilizers are effective in concentrations as low as about 0.01 wt. % based on weight of polymer. There is no theoretical upper limit to the amount of stabilizer which may be used, but amounts between about 0.1 and about 1.0 wt. % are preferred to avoid unnecessary waste of stabilizer. Also, excessive stabilizer is undesirable if, as described below, the plasticizer or polymer from which the lactam solvent is separated is to be recovered for recycle or other use.

Distillation of lactam solvent in accordance with the invention may be carried out under any suitable conditions, but vacuum distillation at total pressures between about 1 and about 100 mm, more usually between about 5 and about 50 mm, is preferred for maximum efficiency and to avoid decomposition of polymer. In the preferred embodiment of the invention in which N-methyl pyrrolidone solvent is distilled from a solution containing polymeric residue of vinyl halide homopolymer production, zinc oxide stabilizer, and the preferred mineral oil plasticizer described above, distillation temperatures preferably are maintained between about 85° and about 165° C. Utilizing distillation temperatures up to about 165° C under these and other preferred operating conditions of the process of the invention, recoveries of 98% and better of the lactam solvent in a highly pure form may be efficiently achieved. Recovered lactam solvents may, of course, be recycled for further use in the process of the invention or may be used for any other suitable purpose.

While the process of the invention may be practiced using compositions of the invention or other solvent solutions which contain substantial amounts of water, it is preferred for the sake of efficiency that the water content of solutions being treated in accordance with the invention be limited to about 10 wt. % and that the water content of recovered lactam solvent be limited to about 1 wt. % water. Excess water may be removed either from solutions to be treated or from recovered solvent by conventional means such as distillation.

Recovery of lactam solvent by distillation in the process of the invention may involve conventional distillation of any type such as fractionating towers, kettle-type boilers, multistage evaporator systems, etc. In any event distillation is preferably carried out to a temperature such that at least about 98 wt. % of the solvent is recovered from the solution.

While the process of the invention may be carried out under any suitable operating conditions, it is generally preferred that for the sake of convenience and efficiency, pressure (except for the distillation step) be maintained at or near atmospheric pressure and that temperatures between about 75° and about 150° C be employed. Such temperatures are sufficient to allow reasonable quantities of polymer to be dissolved in the solvent and, especially where solvent is being recycled for use in the process, minimize the need for heating or cooling solvent other than in connection with the distillation step. Temperatures between about 90° and about 105° C are considered optimum for many applications of the invention, especially those in which N-methyl pyrrolidone solvent is to be recovered from solutions of polymeric residue therein.

Following recovery of lactam solvent from the solution containing polymer in accordance with the invention, the polymer and plasticizer may, if desired, be discarded but are preferably separated with recycle or other suitable use for either or both. In many instances as where the preferred mineral oil plasticizer mentioned above is used in the preferred embodiment described above, a significant amount of the plasticizer can be separated from polymer prior to recycling or other utilization of the polymer.

The following examples will illustrate the novel method and compositions of the present invention. These examples are illustrative only and are not intended to limit the scope of the invention.

EXAMPLE I

This example illustrates the recovery of N-methyl pyrrolidone from a solution thereof containing polymeric residue of polyvinyl chloride (PVC) production. More specifically, the solution from which the N-methyl pyrrolidone (NMP) is recovered contains, in addition to the NMP, 2.48 wt. % dissolved residue from PVC production. To 300 grams of this solution is added 50 grams of a mineral oil boiling above 250° C and having a viscosity of 50/60 S.U.S. at 100° F and 0.5 grams of zinc oxide. The mineral oil acts as a plasticizer for the polymer and the zinc oxide acts as a stabilizer for the polymer. It is believed that the zinc oxide acts as an efficient HCL trap and decreases the amount of polymer decomposition so that the NMP is not contaminated. The zinc oxide also cuts down on corrosion. NMP is then recovered from the composition of matter thus formed by distillation of 3 feet × 1½ inch Vigeraux distillation column at 20% takeoff under 10 mm total pressure. The following fractions are collected:

| Fract. | Temp. (C°) Pot | Temp. (C°) Head | Fract. Wt. | Fract. Vol. (ml) | pH (1% in H₂O) |
|---|---|---|---|---|---|
| 1 | 87 | 84 | 32 | 30 | 6.6 |
| 2 | 87 | 82 | 31 | 30 | 5.8 |
| 3 | 87 | 83 | 29 | 30 | 5.9 |
| 4 | 87 | 83 | 33 | 30 | 6.0 |
| 5 | 88 | 84 | 28 | 30 | 6.0 |
| 6 | 88 | 84 | 33 | 30 | 5.9 |
| 7 | 88 | 83 | 30 | 30 | 6.0 |
| 8 | 90 | 84 | 33 | 30 | 5.9 |
| 9 | 115 | 84 | 27 | 30 | 5.3 |
| 10 | 165 | 84 | 10 | 10 | 5.3 |

As can be seen from the above table, a total of 286 grams of NMP was distilled off and recovered. This represents a recovery of 98% of the NMP from the original solution. A total residue of 56 grams is left of which 36.3 grams is mineral oil which is easily decanted for reuse.

In Example I the very slight drop in pH during distillation of the NMP indicates that very little decomposition of the polymer material is taking place. This is reflected in the purity of the recovered NMP which is found to be about 99% pure.

EXAMPLE II

This example illustrates practice of the invention in a manner similar to that described above in Example I, but without the use of zinc oxide stabilizer. In this example 30 grams of PVC residue from a PVC polymerization reactor is dissolved in 270 grams of NMP. To this solution 30 grams of mineral oil having a boiling range above 250° C and a viscosity of 50/60 S.U.S. at 100° F is added. NMP is then recovered by distillation in the same manner as in Example I with the following results:

| Fract. | Temp. (C°) Pot | Temp. (C°) Head | Fract. Wt. (g) | Fract. Vol. (ml) | pH (1% in H₂O) |
|---|---|---|---|---|---|
| 1 | 89 | 86 | 26 | 25 | 3.8 |
| 2 | 89 | 85 | 27 | 25 | 4.0 |
| 3 | 89 | 86 | 27 | 25 | — |
| 4 | 90 | 86 | 27 | 25 | — |
| 5 | 91 | 87 | 26 | 25 | — |
| 6 | 91 | 87 | 25 | 25 | — |
| 7 | 94 | 86 | 28 | 25 | — |
| 8 | 95 | 86 | 26 | 25 | 3.1 |
| 9 | 125 | 87 | 26 | 25 2 phase | |

The residue comprises 77 grams of black residual material from which no mineral oil can be separated by decanting. As can be seen from the above data, total recovery of NMP is 238 grams representing a recovery of only 88% NMP. The recovered NMP has a purity of 90%. It should be noted from the pH measurements that pH of the solution decreased markedly during distillation, thus indicating decomposition of polymer with resultant loss of material and contamination of NMP.

EXAMPLE III

In this example 30 grams of residue from a polyurethane polymerization reactor is present in a solution of 270 grams of N-cyclohexyl pyrrolidone. To this solution is added 30 grams of tetraethylene glycol plasticizer. N-cyclohexyl pyrrolidone is then recovered by distillation at temperatures ranging from an initial temperature of 127° to an end point of 129° C at a total pressure of 3.0 mm. This distillation results in a recovery of 264 grams of N-cyclohexyl pyrrolidone and leaves a total residue of 66.0 grams.

EXAMPLE IV

To a solution of 30 grams of PVC/vinyl acetate copolymer in 300 grams N-methyl pyrrolidone is added 30 grams of the mineral oil plasticizer used in Example I. NMP is then recovered by distillation in a manner similar to Example I.

EXAMPLE V

Various other compositions of matter which may be formed and treated for removal of lactam solvent in accordance with the invention are typified by those listed below in Table I. In each instance the plasticizer is added to the solution of polymer material in solvent and, where indicated, stabilizer is also added in the amounts shown prior to recovery of lactam solvent by distillation.

TABLE I

| Comp. No. | Solvent | Polymer | Amt. (Wt.% based on Solvent) | Plasticizer | Amt. (Wt.% based on Solvent) | Stabilizer | Amt. (Wt.% based on Polymer) |
|---|---|---|---|---|---|---|---|
| 1 | N-cyclohexyl pyrrolidone | Polyvinyl Chloride | 1 | Mineral Oil | 1 | Stearic acid | 5.0 |
| 2 | N-propyl piperidine | Polyurethane | 15 | Diethylene glycol | 10 | None | 0 |
| 3 | N-n-butyl pyrrolidone | Polyvinyl Chloride/ vinyl acetate | 4 | Tetraethylene glycol | 4 | Zinc stearate | 0.1 |
| 4 | N-isopropyl pyrrolidone | Polymethacrylate | 10 | Mineral oil | 5 | Epoxydized soy bean oil | 2.0 |
| 5 | N-ethyl piperidone | Polyvinyl Bromide/ acrylonitrile | 20 | Mineral oil | 15 | Barium chloride | 0.5 |
| 6 | N-n-hexyl pyrrolidone | Polyvinyl Chloride/ methyl maleate | 6 | Diisopropyl glycol | 2 | Zinc acetate | 1.0 |
| 7 | N-iso-butyl pyrrolidone | Nylon C | 12 | Mineral oil | 2 | Lead salicylate | 0.01 |
| 8 | N-methyl pyrrolidone | Polyvinyl Bromide/ vinyl lauryl ether | 18 | Mineral oil | 10 | Zinc chloride | 0.005 |
| 9 | N-ethyl pyrrolidone | Polyacrylonitrile | 8 | Mineral seal oil | 2 | Zinc phosphate | 0.8 |
| 10 | N-isopropyl piperidone | Polyester (Polylite 31439 Reichhold Chem- | 5 | Triethylene glycol | 2 | Cadmium carbonate | 0.3 |

TABLE I-continued

| Comp. No. | Solvent | Polymer | Amt. (Wt.% based on Solvent) | Plasticizer | Amt. (Wt.% based on Solvent) | Stabilizer | Amt. (Wt.% based on Polymer) |
|---|---|---|---|---|---|---|---|
| | | ical Company) | | | | | |

By the use of the process and compositions of the present invention, N-lower alkyl lactam solvents may be recovered from solutions of polymer material therein with remarkably low loss of solvent and high purity of recovered solvent. In addition, especially in the preferred embodiments of the invention in which stabilizer is also used, it is usually possible to recover substantial portions of the plasticizer for reuse, thus further improving the efficiency of the process. If appropriate, polymer may also, of course, be recycled or otherwise reused.

While the invention has been described above with respect to preferred embodiments thereof, it will be understood by those skilled in the art that various changes and modifications may be made without departing from the spirit or scope of the invention.

What is claimed is:

1. A method for the recovery of N-lower alkyl lactam solvent in which the lower alkyl group contains from 1 to about 7 carbon atoms from a solution of vinyl polymer in such solvent which comprises:
   a. adding to said solution a plasticizer for said polymer, said plasticizer having a boiling point at least about 25° C above the boiling point of the lactam; and
   b. then recovering said lactam from said solution by distillation.

2. The method of claim 1 in which, following recovery of lactam from the solution by distillation, plasticizer is separated from the polymer.

3. The method of claim 1 in which the polymer is polymeric residue of polyurethane production.

4. The method of claim 1 in which the polymer is polymeric residue of vinyl halide homopolymer production and the lactam solvent is N-methyl pyrrolidone.

5. The method of claim 4 in which the plasticizer is a solvent for the polymer.

6. The method of claim 4 in which the plasticizer is a nonsolvent for the polymer.

7. The method of claim 4 in which the vinyl halide is vinyl chloride.

8. The method of claim 4 in which the polymer is present in the solution in amounts between about 1 and about 20 wt. % based on the amount of lactam solvent.

9. The method of claim 4 in which the plasticizer is used in amounts between about 1.0 and about 15.0 wt. % based on the amount of solvent present in the solution.

10. The method of claim 4 in which the plasticizer is mineral oil boiling above about 250° C and having a viscosity between about 40 and about 300 S.U.S. at 100° F.

11. The method of claim 4 in which the distillation is vacuum distillation carried out at a pressure between about 1 and about 100 millimeters.

12. The method of claim 1 in which, prior to recovery of the lactam from the solution, a stabilizer for the polymer is also added in an amount of at least about 0.01 wt. % based on polymer.

13. The method of claim 12 in which the polymer is polymeric residue of vinyl halide homopolymer production, stabilizer is used in amounts between about 0.1 and about 1.0 wt. % based on polymer and plasticizer is separated from polymer following the recovery of lactam from the solution.

14. The method of claim 12 in which the polymer is polymeric residue of PVC production and the stabilizer used is zinc oxide.

15. The method of claim 11 in which the distillation is vacuum distillation carried out at a pressure between about 1 and about 100 millimeters and at a temperature between about 85° and about 165° C.

16. A composition of matter comprising a solution of vinyl polymer in N-lower alkyl lactam solvent, which solution also includes a plasticizer for the polymer, said plasticizer having a boiling point at least about 25° C higher than the boiling point of the lactam solvent.

17. The composition of claim 16 in which the lactam solvent is N-methyl pyrrolidone, the solution also includes a stabilizer for the polymer and the polymer is polymeric residue of vinyl halide homopolymer production and is present in the solution in amounts between about 1 and about 20 wt. % based on lactam solvent.

18. The composition of claim 17 in which the vinyl halide is vinyl chloride, the stabilizer is zinc oxide and the plasticizer is mineral oil boiling above about 250° C and having a viscosity between about 40 and about 300 S.U.S. at 100° F.

19. The composition of claim 18 in which the zinc oxide is present in amounts between about 0.1 and about 1.0 wt. % based on polymer and the mineral oil is present in amounts between about 1 and about 15 wt. % based on solvent.

* * * * *